United States Patent [19]

Hark

[11] 4,406,162
[45] Sep. 27, 1983

[54] APPARATUS FOR CREATING WAVES IN A BODY OF LIQUID

[75] Inventor: William B. Hark, Reading, England

[73] Assignee: Seasom Controls Limited, London, England

[21] Appl. No.: 280,027

[22] Filed: Jul. 2, 1981

[51] Int. Cl.³ .............................................. G01M 10/00
[52] U.S. Cl. .......................................... 73/148; 4/491; 4/591; 272/16; 272/26; 434/126
[58] Field of Search ...................... 73/148; 4/491, 591; 405/79; 272/16, 26, 17; 434/126

[56] References Cited

U.S. PATENT DOCUMENTS

| 818,887 | 4/1906 | Hoeglauer | 4/541 |
|---|---|---|---|
| 826,427 | 7/1906 | Hoeglauer | 4/541 |
| 1,181,406 | 5/1916 | Potter | 4/491 |
| 1,701,842 | 2/1929 | Fisch | 4/491 |
| 2,663,092 | 12/1953 | Laurent et al. | 73/148 |
| 3,287,967 | 11/1966 | Laurent | 4/491 |
| 3,562,823 | 2/1971 | Koster | 4/491 |
| 4,062,192 | 12/1977 | Biewer | 4/491 |
| 4,176,469 | 12/1979 | Timco | 434/126 |

FOREIGN PATENT DOCUMENTS

| 2098560 | 3/1972 | France | 73/148 |
|---|---|---|---|
| 50-116942 | 9/1975 | Japan | 405/79 |
| 50-116943 | 9/1975 | Japan | 405/79 |
| 1592451 | 7/1981 | United Kingdom | 4/541 |
| 484431 | 12/1975 | U.S.S.R. | 73/148 |
| 534665 | 2/1977 | U.S.S.R. | 73/148 |

OTHER PUBLICATIONS

Beach Erosion Board Library, V.F. #916, pp. 75–133; St. Anthony Falls Hydraulic Lab. Report; Project Report #38–Nov. 1953, Wave Generators.

Primary Examiner—Charles A. Ruehl
Assistant Examiner—Tom Noland
Attorney, Agent, or Firm—David A. Jackson; Daniel H. Bobis

[57] ABSTRACT

An apparatus for creating surface waves in a body of liquid is disclosed which comprises a liquid displacer, a motor and a linear actuator for imparting movement to the displacer, and a level sensing device cooperating with the liquid displacer to control liquid level through control of wave generation.

The present apparatus is able to adjust liquid activity to accommodate extraneous wave patterns, and to thereby more accurately control the exact wave patterns generated. The present apparatus is useful for performing wave testing to simulate aquatic conditions for ships, oil rigs and harbor installations.

28 Claims, 9 Drawing Figures

APPARATUS FOR CREATING WAVES IN A BODY OF LIQUID

This invention relates to an improved apparatus for creating surface waves in a body of liquid.

Models of ships, oil rigs and harbour installations are tested with model waves in a test tank, and the apparatus for making these waves is an important part of the equipment in the test tank.

There are three popular kinds of known wave making apparatus namely the flap, the piston and the wedge and these respectively are shown diagrammatically in FIGS. 1a, 1b and 1c of the accompanying drawings. The operation and descriptive name given to each will be readily understood from examination of FIGS. 1a, 1b and 1c, the arrows in each figure indicating the manner in which each displacer is moved to produce the waves. In each of these known types, the displacer is connected to and moved by a drive. The simplest drive is a continuously rotating electric motor and a crank. In the known arrangements using a motor and crank drive, the wave period is set by motor speed and the stroke of the displacer is set by crank eccentricity. It is possible to connect the displacer and motor with a linkwork which allows stroke adjustment without stopping the motor, and where it is desired that the apparatus should be capable of producing any of a desired spectrum of wave types, more complicated drives using hydraulic actuator and servo-systems can be used.

In all of the known arrangements, the position of the displacer is controlled by the drive and within the limits of the strength of the mechanical parts and the drive, the water displacer is an irresistable object which is reciprocably driven. This has the disadvantageous effect that, when the apparatus is used in a test tank, in general, waves which are reflected back to the displacer behave as though they were striking, for example, a vertical cliff face and are reflected therefrom with a reflection co-efficient close to unity. Waves so reflected meet with new waves being produced by the apparatus and this leads to unwanted instability in the wave pattern in the tank. Even when the displacer is not being driven, because it still behaves like vertical cliff, the liquid surface in the test tank takes a long time to become calm.

The present invention in one aspect seeks to provide apparatus for creating surface waves in a body of liquid and which has a displacer connected to a drive motive means but which, as far as reflected waves are concerned, does not behave as an irresistable object such as a vertical cliff.

According to one aspect of the present invention there is provided apparatus for creating surface waves in a body of liquid comprising a liquid displacer, means for moving the liquid displacer back and forth to create the waves in the body of liquid, means for sensing the level of the body of liquid for producing a signal representative of the level of the liquid in the region of the displacer and for controlling the means for moving the liquid displacer in dependence upon said signal so as to compensate for a variation in water level resulting from the presence of reflected waves on the region of the displacer.

The sensing means preferably is arranged adjacent the displacer surface which engages the body of liquid so that with increasing liquid level at the displacer surface, owing to the impingement on said surface of a reflected wave, the liquid level will start to rise from a pre-set level. This will be sensed by the sensing means which in turn causes the displacer to be moved so as to prevent the increase in liquid level.

If the liquid level falls below the pre-set level the displacer is moved to maintain the level and prevent the level from falling. The displacer is acting therefore, as far as waves arriving at the displacer are concerned, as a means of removing the height differentials in the body of liquid due to the incoming waves and therefore in fact as a means of accommodating or compensating for the incoming waves.

When the displacer is being moved to generate waves and there are also incoming waves, the mixture of those at the displacer surface will give rise to a liquid level height deviation at the displacer surface from a norm which would exist if the displacer were generating only. It is this deviation which is sensed by the sensing means and the displacer adjusted accordingly.

The means for displacing the displacer preferably comprises a motor and a linear actuator, in particular a recirculating ball screw device. The motor may be a printed circuit armature reversible electric motor which is easy to control on the basis of the signal created by the sensing means. The motor is connected to the screw device such that rotation of the motor effects displacement linearly of one of the screw device components, which is connected to the displacer. Where the displacer is in the form of a paddle (the preferred type in this aspect of the invention) due arrangement will have to be made to take into account that the screw device has to cause the displacer to pivot back and forth. In practice this will not create any noticable problem as the range of the displacer swing will be relatively small.

The displacer may be a paddle and the apparatus may be arranged so that there is liquid on both sides of the paddle. Alternatively, the paddle may be supported, by a spring suspension designed to give loading characterisation approaching the loading characteristics on the paddle when there is liquid at both sides. In this respect, at least, the invention represents an improvement upon displacer control devices which measure the forces acting on the wave-creating face of the displacer. The invention offers a further improvement in that it can be applied to wave-makers of much larger size.

The spring arrangement may comprise a main blade spring and a strut blade spring lying at an angle to the main blade spring, the strut spring being arranged to buckle at a pre-set compressive loading thereon.

The paddle may be a rigid plate or blade, but it is preferred that it be compliant. That is to say that it yields under loading but is not so flexible as to be incapable of performing its wave making function. When the paddle is compliant, the lower end can be rigidly fixed or carried by a spring suspension as aforesaid. The paddle may be, for example, of thin sheet metal.

In a modification of the invention, the displacer is formed by a wall of a tank for holding the body of liquid, said wall being formed of a compliant material. Moreover, with this arrangement there may be a plurality of means for displacing side by side regions of the said wall in that each region in fact forms a displacer, each displacer being associated with its own level sensing device.

The tank will preferably be entirely of compliant material and may be suspended by the upper edges of the walls thereof.

In regard to the use of a compliant displacer, this indeed forms a second aspect of this invention, as the compliant displacer has wider application than merely in conjunction with a level sensing means, and in accordance with the second aspect of the invention there is provided apparatus for creating surface waves in a body of liquid comprising at least one liquid displacer means, means for moving the or each displacer means back and forth to create the waves in the body of liquid, wherein the or each said liquid displacer means is of a sheet material which is compliant so as to flex as it is moved back and forth to create said waves.

The or each liquid displacer means may be a paddle for positioning in a tank for holding the body of liquid, or in another arrangement the apparatus includes a tank for holding the body of liquid and the or each displacer means is a portion of a wall of the tank, which wall is formed of said compliant material.

Embodiments of the present invention will now be described by way of example, with reference to FIGS. 1a to 7 of the accompanying diagrammatic drawings, and of which:

FIG. 3 is a side view showing a preferred method of supporting the paddle of the apparatus shown in FIG. 1a;

Figure 1A:
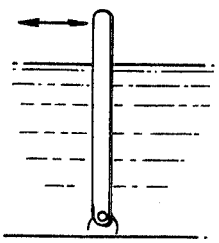
FIGS. 1a–1b show known wave making apparatus.
Figure 1B:
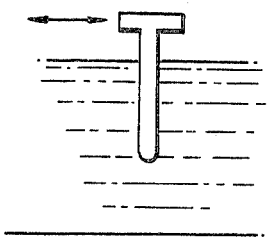
Figure 1C:
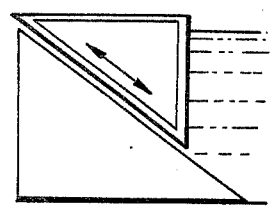
Figure 2:
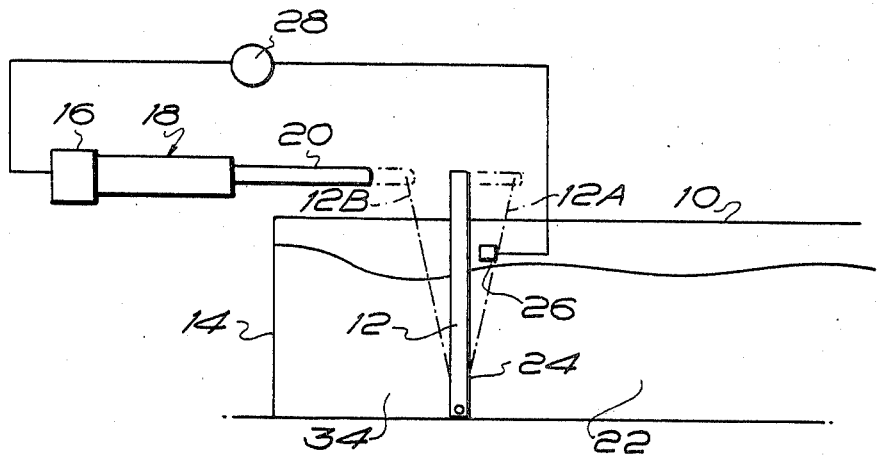
FIG. 2 is a sectional side view of apparatus according to the invention.

Referring to FIG. 2 initially, in this figure there is shown a test tank 10 having a paddle displacer 12 close to an end 14 of the tank. The means for moving the displacer 12 between the extreme positions 12A and 12B is an electric motor 16.

Motor 16 is a printed circuit motor and is drivingly connected to a re-circulating ball screw device 18 having an actuator rod 20 directly coupled to the paddle 12. Motor 16 is reversible and rotation of same in one direction causes actuator 20 to move outwardly while rotation of motor 16 in the opposite direction causes actuator 20 to retract. By repeatedly reversing the motor direction the paddle 12 is oscillated between the positions 12A and 12B as shown.

In use of the apparatus, it is the body of liquid 22 at the face 24 of paddle 12 in which the waves are to be created, and adjacent face 24 is a level or height sensing device 26 of conventional form or of a form having a self-seeking zero position in the event of overall increase or decrease in level of the tank for sensing the level of the body of the liquid 22 at the face 24 and for producing electrical signals representative of such level and delivering same to an amplifying and control circuit 28. This control circuit 28 controls the operation of the motor 16 and hence the position of the paddle 12. The sensing device 26 is operative for causing the dissipation of waves arriving at face 24. When the apparatus is creating waves, the level of liquid at the sensing device will rise and fall and the control circuit is set to treat this as normal. However, when a wave arrives at face 24, the level of the liquid at the face 24 will tend to deviate from the normal. Device 26 senses this and feeds back a signal to motor 16 causing it to rotate such as to move paddle 12 towards position 12B, thereby in effect creating space for accommodating the liquid of the incoming wave if the level is deviating by rising. If the level at face 24 deviates from the normal by dropping below the predetermined level, the same sequence of operation takes place, except that the paddle 12 is displaced in the opposite direction to compensate for the falling tendency.

By so operating the paddle 12 it can be caused to accommodate or compensate for waves arriving at face 24 which is desirable as explained hereinbefore whilst still generating waves of the pre-set amplitude and frequency.

When the displacer is not generating waves, the sensing device can be made operative to accommodate incoming waves, in this case the said normal being level water.

Figure 3:
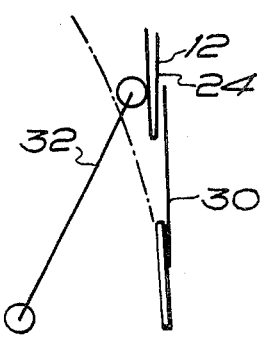
Figure 4:
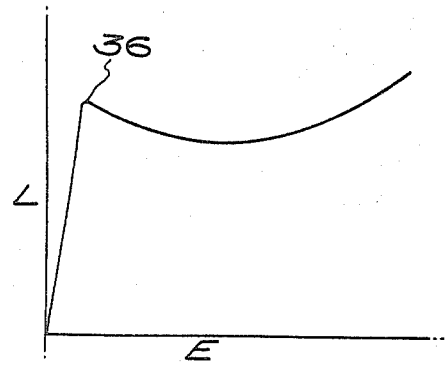
FIG. 4 is a graph showing the force/deflection characteristic of the support arrangement shown in FIG. 3.

Instead of pivoting the paddle 12 at the base of the tank 10, it may be carried by the spring arrangement illustrated in FIG. 3 which comprises a main spring blade 30 and strut spring blade 32 located to the rear of active face 24 of the paddle. By using this spring mounting arrangement, it is not necessary to provide the small body 34 of liquid at the opposite side of paddle 112 from face 24 as the spring arrangement 30, 32 gives basically similar loading characteristics to the paddle as does the body 34 of liquid. The force deflection characteristic of the spring arrangement 30, 32 is shown in FIG. 4 and it will be seen that up to a yielding point 36, there is only a small deflection within increasing load. At point 36 however, the strut 32 in fact buckles and substantial deflection takes place even to the extent as shown in FIG. 4 that the load can be reduced and the substantial extension will continue.

Figure 5:
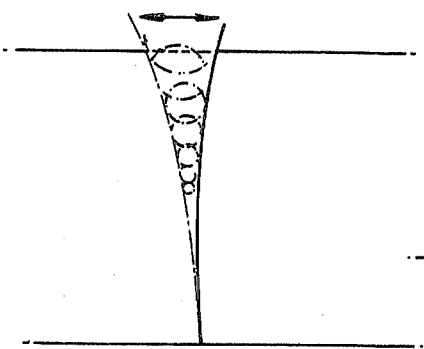
FIG. 5 is a side view showing why it is advantageous to employ a compliant padele.

It has been assumed in the above description that the paddle 12 is in fact a rigid plate. It can be rigid, but desirably it will be of a compliant material so that it curves generally to an exponential form as shown in FIG. 5 as it is oscillated. The paddle may be of tapering thickness to assist this effect. This particular form of curving is desirable, as the neutral orbit diameters of particles in a wave decrease exponentially with depth into the body of liquid as shown in FIG. 5 by the dotted line circles. A suitable material for forming a compliant paddle is sheet metal.

Figure 6:
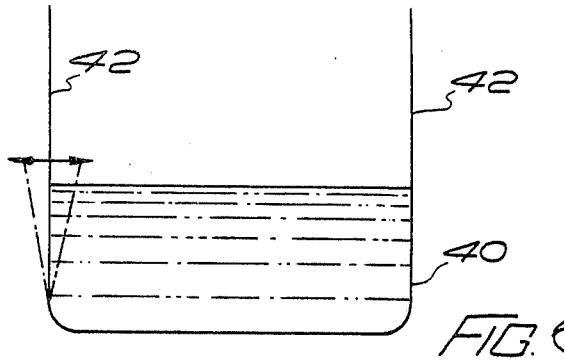
FIGS. 6 and 7 are a sectional side view and a plan view respectively of a test tank having a compliant wall and forming apparatus according to a further embodiment of the invention.
Figure 7:
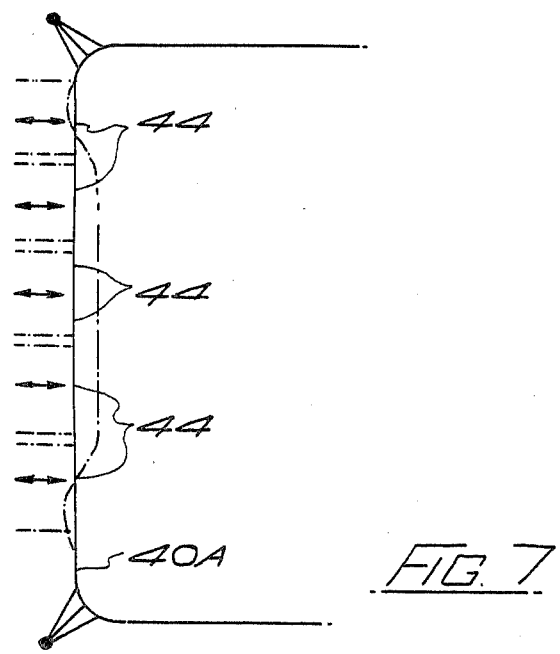

FIGS. 6 and 7 show a modified form of the present invention, and in particular what is shown in these figures is a test tank 40 which as a whole is of compliant material such as heavy gauge rubber or sheet metal, and the tank is suspended by wires or ropes 42. By making the tank in this way, the material of the tank takes the loading in tension in the manner of a catenary suspension, and the tank wall experiences no bending movement and one or several side walls can be used as the displacer. The wires or ropes may, under the loading, splay slightly to the vertical in order to provide horizontal force components to support the tank. The horizontal forces along the edge of the tank may be supported by ropes which are tensioned, when the tank is full, by the weight of liquid in the tank. In the arrangement shown in FIG. 7, the wall 40A has five regions 44 each in fact forming a displacer similar to the displacer described with reference to FIG. 2, and each being provided with its sensing and displacement means as shown in FIG. 2. It will be normal in a test tank of any significant size to use a plurality of displacers side by side, and the arrangement of FIG. 7 provides an advantage over side by side displacers in that it can be utilised substantially to eliminate interference between the respective wave patterns created and absorbed by adjacent displacers. Furthermore, if the end two displacer regions 44 shown in FIG. 7 are used to isolate a wave pattern created by the remaining displacer regions 44, there will be effective isolation of the wave pattern by virtue of the fact that the entire wall 40a is compliant and there will be smooth transitions between each end displacer region 44 and its neighbour even although these regions may be oscillated out of phase by any amount up to 180° where the material of the tank permits.

I claim:

1. Apparatus for creating surface waves in a body of liquid comprising a liquid displacer, means for moving the liquid displacer back and forth to create the waves in the body of liquid, and means for sensing the level of the body of liquid for producing a signal representative of the level of the liquid in the region of the displacer and for controlling the means for moving the liquid displacer in dependence upon said signal so as to compensate for a variation in liquid level resulting from reflected waves in the region of the displacer.

2. Apparatus according to claim 1, wherein the sensing means is arranged adjacent the displacer surface which engages the body of liquid so that with increasing liquid level at the displacer surface, owing to the impingement on said surface of a reflected wave, the liquid level will start to rise from a pre-set level.

3. Apparatus according to claims 1 or 2, wherein the sensing means is arranged not to produce said signal when the level of the liquid rises and falls as a result only of the waves being directly generated in the liquid.

4. Apparatus according to claim 3, wherein the means for moving the displacer comprises a motor and a linear actuator, in particular a re-circulating ball screw device.

5. Apparatus according to claim 4, wherein the displacer is a paddle.

6. Apparatus according to claim 5, wherein the paddle is supported by a spring suspension comprising a main blade spring and a strut blade spring lying at an angle to the main blade spring, the strut spring being arranged to buckle at a pre-set compressive loading thereon.

7. Apparatus according to claim 6, wherein the paddle is compliant so that it will yield to an exponential shape under loading against the liquid.

8. Apparatus according to claim 5, wherein the paddle is compliant so that it will yield to an exponential shape under loading against the liquid.

9. Apparatus according to claim 4, wherein the displacer is a compliant portion of a tank for containing the body of liquid in which the surface waves are to be created.

10. Apparatus according to claim 3, wherein the displacer is a paddle.

11. Apparatus according to claim 10, wherein the paddle is supported by a spring suspension comprising a main blade spring and a strut blade spring lying at an angle to the main blade spring, the strut spring being arranged to buckle at a pre-set compressive loading thereon.

12. Apparatus according to claim 11, wherein the paddle is compliant so that it will yield to an exponential shape under loading against the liquid.

13. Apparatus according to claim 10, wherein the paddle is compliant so that it will yield to an exponential shape under loading against the liquid.

14. Apparatus according to claim 3, wherein the displacer is a compliant portion of a tank for containing the body of liquid in which the surface waves are to be created.

15. Apparatus according to claims 1 or 2, wherein the means for moving the displacer comprises a motor and a linear actuator, in particular a re-circulating ball screw device.

16. Apparatus according to claim 15, wherein the displacer is a paddle.

17. Apparatus according to claim 16, wherein the paddle is supported by a spring suspension comprising a main blade spring and a strut blade spring lying at an angle to the main blade spring, the strut spring being arranged to buckle at a pre-set compressive loading thereon.

18. Apparatus according to claim 17, wherein the paddle is compliant so that it will yield to an exponential shape under loading against the liquid.

19. Apparatus according to claim 16, wherein the paddle is compliant so that it will yield to an exponential shape under loading against the liquid.

20. Apparatus according to claim 15, wherein the displacer is a compliant portion of a tank for containing the body of liquid in which the surface waves are to be created.

21. Apparatus according to claims 1 or 2, wherein the displacer is a paddle.

22. Apparatus according to claim 21, wherein the paddle is supported by a spring suspension comprising a main blade spring and a strut blade spring lying at an angle to the main blade spring, the strut spring being arranged to buckle at a pre-set compressive loading thereon.

23. Apparatus according to claim 22, wherein the paddle is compliant so that it will yield to an exponential shape under loading against the liquid.

24. Apparatus according to claim 21, wherein the paddle is compliant so that it will yield to an exponential shape under loading against the liquid.

25. Apparatus according to any of claims 1 or 2, wherein the displacer is a compliant portion of a tank for containing the body of liquid in which the surface waves are to be created.

26. Apparatus for creating surface waves in a body of liquid in accordance with claim 1, comprising at least one liquid displacer, means for moving said at least one other displacer back and forth to create the waves in the body of liquid, wherein and said at least one displacer is of a sheet material which is compliant so as to flex as it is moved back and forth to create said waves.

27. Apparatus according to claim 26, wherein said at least one liquid displacer is a paddle for positioning in a tank for holding the body of liquid.

28. Apparatus according to claim 26, including a tank for holding the body of liquid and wherein said at least one displacer is a portion of a wall of the tank, which wall is formed of said compliant material.

* * * * *